United States Patent [19]

Wisner et al.

[11] Patent Number: 5,052,826
[45] Date of Patent: Oct. 1, 1991

[54] DISTRIBUTED LOAD JOURNAL BEARING

[75] Inventors: George R. Wisner, Deep River; François M. Mottier, West Hartford, both of Conn.

[73] Assignee: United Technologies Corporation, Hartford, Conn.

[21] Appl. No.: 558,912

[22] Filed: Jul. 27, 1990

[51] Int. Cl.$^5$ .............................................. F16C 17/03
[52] U.S. Cl. ..................................................... 384/310
[58] Field of Search ............... 384/310, 312, 116, 117, 384/311, 309

[56] References Cited

U.S. PATENT DOCUMENTS

| | | | |
|---|---|---|---|
| 3,784,265 | 1/1974 | Cornford | 384/310 |
| 3,917,365 | 11/1975 | Jenness | 384/310 |
| 4,175,800 | 11/1979 | Chaffee et al. | 384/116 |
| 4,686,403 | 8/1987 | Hackstie et al. | 384/310 |

Primary Examiner—Lenard A. Footland
Attorney, Agent, or Firm—Peter R. Ruzek

[57] ABSTRACT

A bearing arrangement for rotatably supporting a generally cylindrical journal having an outer circumferential surface exhibiting out-of-round deviations superimposed on a perfect cylinder that is centered on a longitudinal axis, with the journal acting on the bearing arrangement with a basic radial action force aimed along a reference half-plane extending in a predetermined radial direction from the longitudinal axis, includes a pair of bearing pads situated at respective contact locations that are spaced in opposite circumferential directions from the reference half-plane. Each of the bearing pads extends substantially over the entire length, but at most only over a small fraction of the circumference, of the outer circumferential surface, such that the bearing pads are at most in a very limited area contact with the outer circumferential surface when the journal is supported thereon. The circumferential spacing of the contact locations is by respective half-angles that are so selected in dependence on the character of the OOR deviations as to at least minimize the extent of vibrations of the journal in and opposite to at least one of the predetermined radial direction and a radial direction normal to the half-plane.

6 Claims, 5 Drawing Sheets 5,052,826

DISTRIBUTED LOAD JOURNAL BEARING

DESCRIPTION

1. Technical Field

The present invention relates to bearings in general, and more particularly to journal bearings.

2. Background Art

There are already known various constructions of bearings, among them so-called sleeve bearings that are being used for supporting cylindrical mounting portions (hereafter collectively referred to as journals) of shafts or similar rotatable elements or machine parts for rotation about their respective axes of rotation. Such sleeve bearings work quite well, or are at least acceptable for use, in a multitude of applications in which it can either be assured that the so-called out-of-round (OOR) deviations of the journal, that is the deviations of the actual shape of the circumferential surface of the journal from the ideal perfectly cylindrical shape centered on the axis of rotation, are so small as to be negligible, or in which the vibrations that are generated during the rotation of a journal having such OOR deviations in the associated bearing sleeve as a result of the constant or intermittent shifting of the center of gravity of the rotating part relative to the bearing are no cause for concern.

Currently, many low cost devices including rotating parts, such motor rotors, are built with sleeve bearings. Yet, it has been established that even relatively minute OOR deviations (few hundred microinches) of the journals can cause armature or housing vibrations. In many instances, such vibrations are objectionable either because they themselves are felt by the prospective users of such devices, or because they manifest themselves in the form of objectionable noise. At least to some extent, such OOR deviations are attributable to the manner in which the journals of such low cost devices are manufactured and they could be reduced, if not eliminated, by employing more precise (and more laborious and hence more expensive) manufacturing techniques in their fabrication; yet, the resort to such techniques would significantly increase the cost of such devices and thus would not be warranted.

Accordingly, it is a general object of the present invention to avoid the disadvantages of the prior art.

More particularly, it is an object of the present invention to provide a sleeve bearing for supporting a journal exhibiting a significant degree of OOR deviations, which bearing does not possess the disadvantages of the known bearings of this kind.

Still another object of the present invention is to develop the bearing of the type here under consideration in such a manner as to reduce the armature or housing vibration amplitude without increased tightening of the journal finishing tolerances.

It is yet another object of the present invention to devise a bearing of the above type which would keep the noise generated by a device incorporating at least one such bearing and an associated journal supported thereby to a minimum.

A concomitant object of the present invention is to design the bearing of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a bearing arrangement for rotatably supporting a generally cylindrical journal having an outer circumferential surface exhibiting out-of-round (OOR) deviations superimposed on a perfect cylinder centered on a longitudinal axis, wherein the journal acts on the bearing arrangement with a basic radial force action aimed along a reference half-plane extending in a predetermined radial direction from the longitudinal axis. According to the invention, the bearing arrangement includes a pair of bearing pads that are situated at respective contact locations which are spaced in opposite circumferential directions from the reference half-plane. Each of the bearing pads extends substantially over the entire length, but at most only over a small fraction of the circumference, of the outer circumferential surface to be at most in a very limited area contact with the aforementioned outer circumferential surface when the journal is supported thereon. It is particularly aAdvantageous when such contact locations are circumferentially spaced from the reference half-plane by respective half-angles that are so selected in dependence on the character of the OOR deviations as to at least minimize the extent of vibrations of the journal in and opposite to at least one of the predetermined radial direction and a radial direction normal to the half-plane.

BRIEF DESCRIPTION OF THE DRAWING

The present invention will be described in more detail below with reference to the accompanying drawing in which.

BEST MODE FOR CARRYING OUT THE INVENTION

Figure 1:
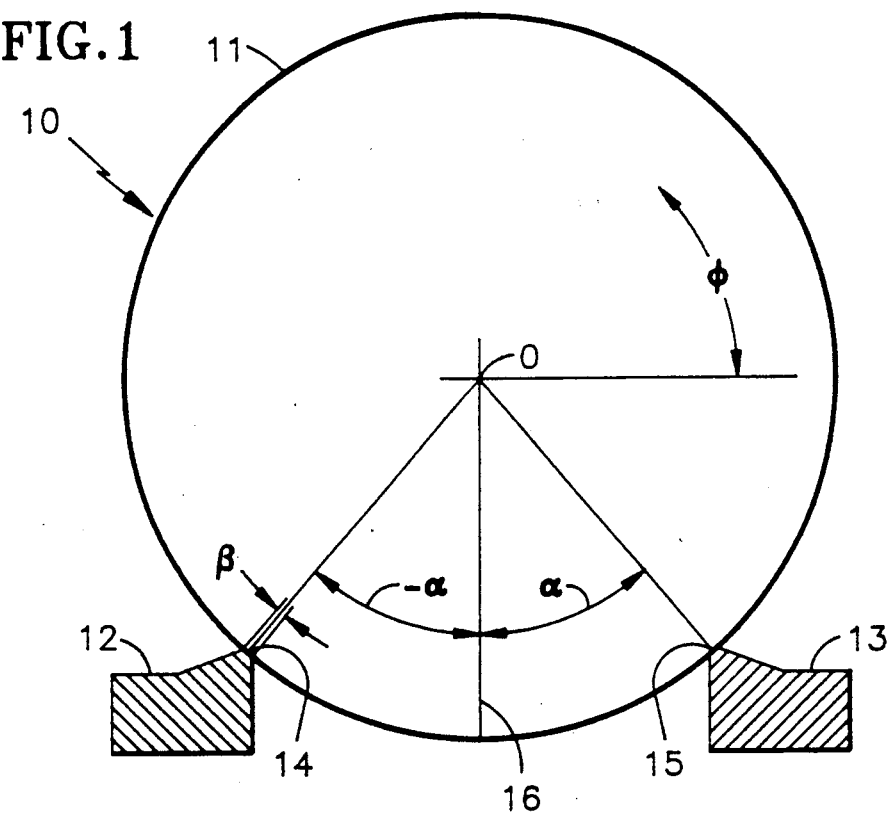
FIG. 1 is a simplified axial sectional view of a journal that is supported, in accordance with the present invention, on two circumferentially spaced bearing pads.

Referring now to the drawing in detail, and first to FIG. 1 thereof, it may be seen that the reference numeral 10 has been used therein to identify a journal. The journal 10 forms a portion of a part to be supported on a journal bearing for rotation and, to this end, it has a substantially cylindrical outer circumferential surface 11 that is generally centered on a longitudinal axis of the journal 10 shown to intersect the plane of the drawing at a center point O.

It is to be mentioned at this juncture that the above part is subjected, during its rotation, to various external forces, such as gravitational forces, loading forces exerted thereon by force transmission members, such as gears and the like and, last but not least, one or more reaction forces exerted thereon by one or more bearings. These external forces are in balance at any instant of time so that the total radial reaction force exerted on the journal 10 by the journal bearing supporting the same cancels the instantaneous radially oriented resultant action force effective at the journal 10. For the purposes here at hand, it is necessary for the above action force to include a basic action force that passes through the longitudinal axis of the journal 10 ans is aimed in a single radial direction relative to the journal bearing at least during the use of the part equipped with the journal 10 to define with the longitudinal axis a reference half-plane that is immovable with respect to the journal bearing. In FIG. 1, this half-plane is indicated to extend vertically downwardly from the longitudinal axis represented by the center point O, and this orientation is being used herein to establish a frame of reference for various directions referred to herein. Thus, "vertical" means parallel to, and "horizontal" means normal to, this half-plane, regardless of the actual spatial position of this half-plane during the use of the above part and the jounal bearing supporting the same.

For the purposes of the present discussion, it will be assumed that the aforementioned longitudinal axis of the journal 10 passes, in accordance with good engineering practice, through the center of gravity of the part that is to be supported for rotation about this longitudinal axis, so that the part is dynamically balanced with respect to the longitudinal axis and, consequently, the rotation of the part about the longitudinal axis of the journal 10, which rotation is indicated in the drawing by a curved arrow that is representative of, and is identified by, an angle coordinate $\phi$, in and of itself does not result in any vibratory motion of such part. This, of course, presupposes that the spatial position of the aforementioned longitudinal axis does not change as the part rotates. However, this condition would only be satisfied if the shape of the outer circumferential surface 11 of the journal 10 conformed to that of an ideal cylinder.

However, as alluded to before, the outer circumferential surface 11 is not always perfectly cylindrical; rather, it includes out-of-round (OOR) deviations the presence of which causes the longitudinal axis (and consequently the center point O) to conduct translational movements, generally in (for the point O) and parallel to (for all other points located on the longitudinal axis) the plane of the drawing, when the journal 1? and the part provided with it are supported on a traditional sleeve-shaped journal bearing, resulting in vibrations and attendant noise.

In accordance with the present invention, this drawback is avoided, in situations where the part having the journal 10 is loaded with the aformentioned unidirectionally directed basic radial action force, in that the journal 10 is supported for rotation on two circumferentially spaced bearing pads 12 and 13 which are in contact, at respective support areas 14 and 15, with the nominally round outer circumferential surface 11 of the journal 10. The axial extent of each of the pads 12 and 13 is at least as large as that of the conventional sleeve bearing, but the circumferential extent of each of the support areas 14 and 15 of the respective pads 12 and 13, which is indicated in FIG. 1 by an angle $\beta$ that is measured from the journal center or longitudinal axis O, is quite small, typically one to a few degrees.

Each of the support areas 14 and 15 of the pads 12 and 13 may be, at least initially, merely in line contact with the circumferential surface 11. This can be achieved by substantially conforming the shape of each of the support areas 14 and 15 to that of a part of an imaginary cylinder having a radius exceeding that of the outer circumferential surface 11 of the journal 10. However, this line contact, if initially present, may eventually turn into area contact as the pads 12 and 13 or their support areas 14 and 15 are worn down as the journal 10 rotates or turns while being supported thereon. In any event, the circumferential extent of the areas of contact of the pads 12 and 13 with the journal 10 is very small.

In accordance with the present invention, the bearing pads 12 and 13, or more accurately the contact lines or center lines of the contact areas of the support areas 14 and 15 thereof with the outer circumferential surface 11 of the journal 10, are not only circumferentially spaced from one another, but are also, an even more importantly, strategically located in dependence on the OOR function, in a manner that will be discussed in more detail below, at respective half-angles $\alpha$ and $-\alpha$ with respect to the aforementioned reference half-plane that, as mentioned before, passes through the longitudinal axis of the ideal perfectly cylindrical journal 10 and extends vertically in the drawing.

The manner in which the half-angles $\alpha$ and $-\alpha$ that determine the circumferential positions of the bearing pads 12 and 13 are chosen in accordance with the present invention will now be discussed and analyzed with respect to some special cases of the OOR function, so as to establish principles that can then be applied, in a manner that will become readily apparent hereafter, to other, usually more complex, OOR functions. It will be appreciated that the selection of the location of the center point O along the longitudinal axis of the journal 10 is totally arbitrary, so that the discussion which will be presented below with respect to the behavior of the center point O is equally applicable to any other point on the longitudinal axis and, consequently, to the longitudinal axis in its entirety.

For the purpose of the aforementioned analysis, it will first be assumed that the OOR function describing the shape of the surface 11 in its entirety is a variable order sinusoidal OOR function. Thus, the journal surface can be described by the equation $$r(\phi) = r_o + \rho \sin(k \cdot \phi)$$

wherein:
 $\phi$ is the angle coordinate;
 $r(\phi)$ is the distance from the nominal journal center point O to the journal surface 11 for the respective angle coordinate $\phi$;
 $r_o$ is the nominal journal radius;
 $\rho$ is the amplitude of the sinusoidal OOR function; and
 k is the order of the sinusoidal OOR function.

The locations of the pads 12 and 13 can be expressed in polar coordinates, based on a coordinate origin at the nominal journal center point O, as $[r_o \sin\alpha, -r_o \cos\alpha]$ and $[-r_o \sin\alpha, -r_o \cos\alpha]$. The instantaneous position of the journal center point O is determined as that of the intersection of circles centered at the bearing pads 11 and 12, with radii $r(\phi)$ given by the above equation for the locations of contact of the outer circumferential surface 11 of the journal 10 with the respective pads 12 and 13.

The effect of the OOR deviations, the magnitude of which ($\rho$) is typically in the area of three orders of magnitude smaller than that of the nominal journal radius $r_o$, is that the center point O of the journal 10 that is supported on the pads 12 and 13 conducts movements as the journal 10 rotates, and the amplitude and direction of such movements varies over time (periodically in the cases discussed here where the OOR function exhibits a sinusoidal behavior) in dependence not only on the instantaneous value of the angle $\phi$, but also on the (chosen) value of the half-angle $\alpha$. Inasmuch as any movement can be represented by a vector having a length representative of the instantaneous amplitude and a direction corresponding to the instantaneous direction of such movement, and any vector can be broken down into vector components parallel to the respective axes of any selected coordinate system, the movements of the journal center O in the horizontal and vertical directions of the plane of FIG. 1 (i.e. relative to the aforementioned reference half-plane) will be considered separately in the following discussion, so as to facilitate the understanding of the present invention. Another, and possibly more important, reason for this separate consideration is that, at least in some cases, horizontal movements of the journal center point O may be more objectionable than vertical ones, or vice versa.

Figure 2:
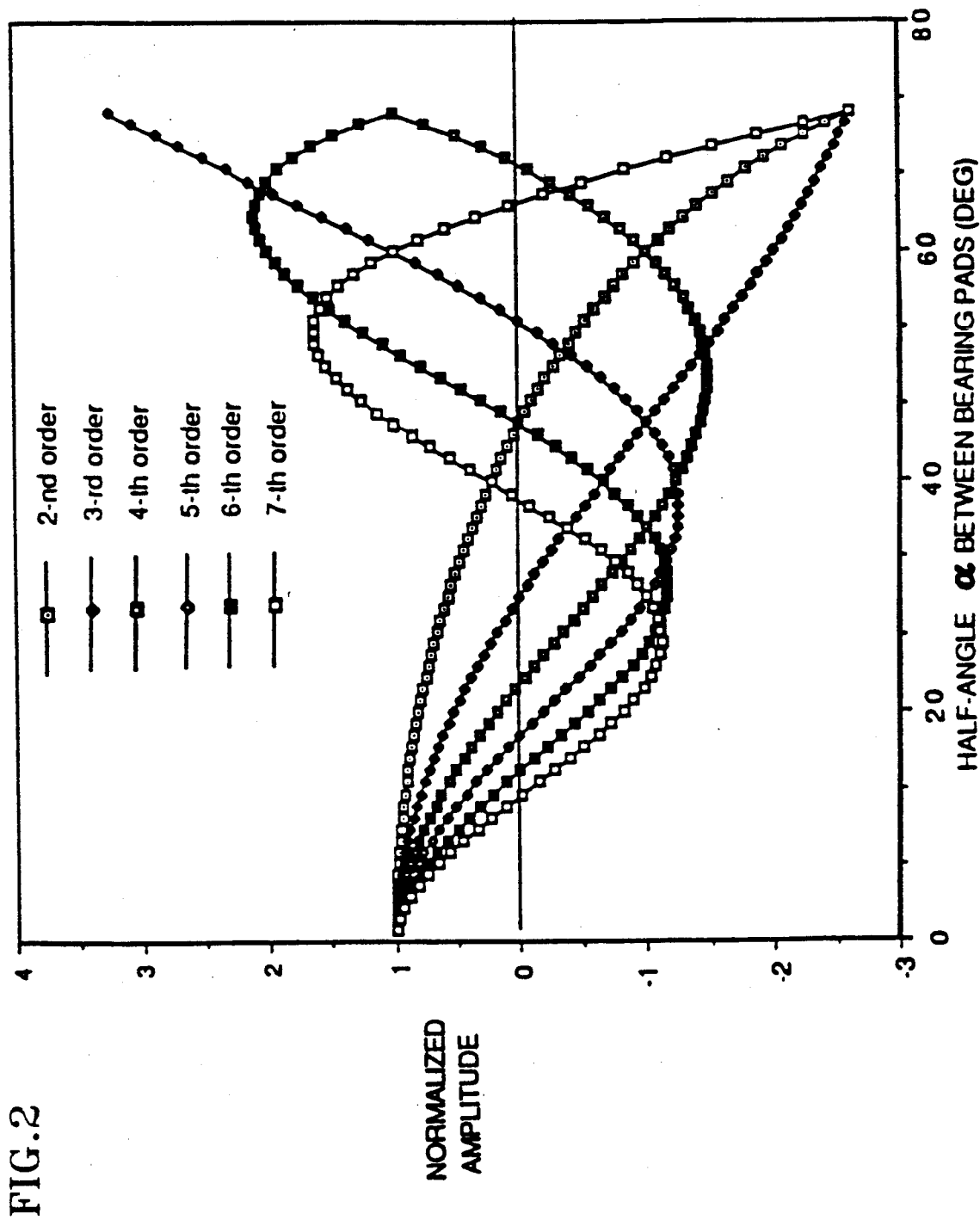
FIG. 2 is a graphic representation of the dependence of the vertical oscillation amplitude of a journal supported in the manner illustrated in FIG. 1 on the circumferential spacing of the bearing pads, for a journal the outer circumferential surface of which exhibits out-of-round deviations of simple sinusoidal characteristics of several different orders.
Figure 3:
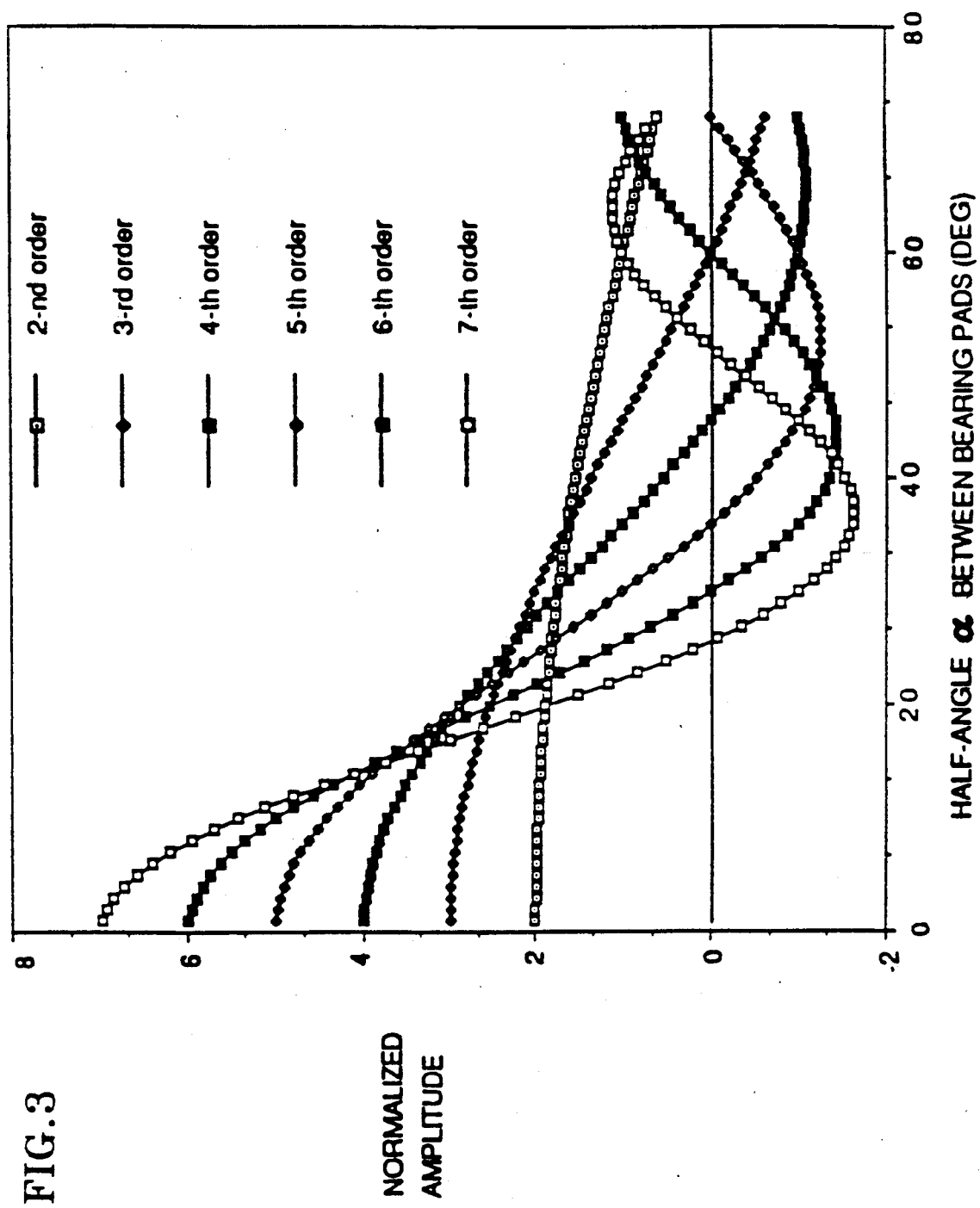
FIG. 3 is a graphic representation similar to that of FIG. 2 and depicting the same type of dependence but this time for the horizontal oscillation amplitude.

FIGS. 2 and 3 depict the dependence of the normalized vertical and horizontal amplitudes, respectively, of the movement of the journal center point O (and thus of the entire journal longitudinal axis) on the absolute value of the half-angle $\alpha$ for sinusoidal OOR functions of the second to seventh order (i.e. for $k=2\ldots 7$). The normalization of such amplitudes was accomplished by relating such amplitudes for all half-angles o to those obtained in the as the half-angle $\alpha$ approaches 0°.

It may be seen in FIG. 2 of the drawing that, if the two bearing pads 12 and 13 were placed close together, with a half angle $\alpha$ of 5° or less, the normalized amplitude of the vertical motion for any order would approach the amplitude of the OOR function; on the other hand, FIG. 3 of the drawing shows that the normalized horizontal or lateral motion would be very large under these conditions, such as about seven times the OOR amplitude for the seventh order sinusoidal function. It will be appreciated that such close spacing of the pads 12 and 13 would not have much of a beneficial effect, if any, because it would merely result in a situation where the journal motion would be a reasonable approximation of that encountered when the journal bearing has the traditional bearing sleeve configuration, where the journal moves back and forth within the lateral constraint of the sleeve. On the other hand, the curves depicted in FIGS. 2 and 3 have been discontinued at values of the half-angle $\alpha$ amounting to about 60° because they would have no meaningful interpretation for values greater than that since the journal 10 would not be able to turn freely at such excessive angles.

As indicated in FIGS. 2 and 3, the OOR vertical or horizontal oscillation amplitude becomes zero for any one of the orders at a respective predetermined intermediate half-angle $\alpha$ having a value between about 20 and 60° (and corresponding to that at which the respective curve for that order intersects the zero amplitude line), albeit not for all orders simultaneously, nor for both lateral (horizontal) and vertical motion at the same order. Hence, it is possible, if the journal OOR deviations conform to a known sinusoidal function of a given order, to null out journal oscillations in either the vertical or the horizontal plane, but not both at the same time, by choosing the half-angle $\alpha$ accordingly.

Such conformity, however, more often than not, will be the exception rather than the rule in real life situations. Yet, as is well known, any periodic function consists of or can be broken down into a number of frequency domain components thereof, using well-known principles and techniques of Fourier analysis. Now, inasmuch as the OOR function is a periodic function by definition since the outer circumferential surface 11 returns to its initial position with each journal revolution, it is possible, in accordance with the present invention, to use Fourier analysis in conjunction with any such periodic OOR function, utilizing and assigning proper weights to the various order sinusoidal functions depicted in FIGS. 2 and/or 3 of the drawing, and ascertaining by differential calculus techniques the angle $\alpha$ at which the effect of the overall OOR function is minimized either in the horizontal direction, or in the vertical direction, or overall, depending on what kind of vibrations is the most bothersome.

As advantageous as the above discussed approaches may be in situations where the OOR function is a simple sinusoidal function, or a combination of a small number of sinusoidal functions, and does not vary to any appreciable extent throughout a whole journal batch or run, it would be impractical if not impossible to ascertain the OOR function for each journal 10 of a series individually, or to analytically minimize the OOR function effect in situations where the OOR function is a combination of a large number of frequency domain components; consequently, under these circumstances, the angle $\alpha$ is selected in accordance with the present invention so as to be a reasonable compromise that will minimize the overall extent of vibrations for the entire journal production run or batch, albeit not for each individual journal 10 thereof. Experience has shown that, in the case of random OOR deviation functions of the production journals 10, it is often best to arrange the pads 12 and 13 under a half-angle $\alpha$ of 45°. Yet, other values of the half-angle $\alpha$ may be preferable if specific higher order deviations from the true circular cross section cause dominant vibrations.

Figure 4:
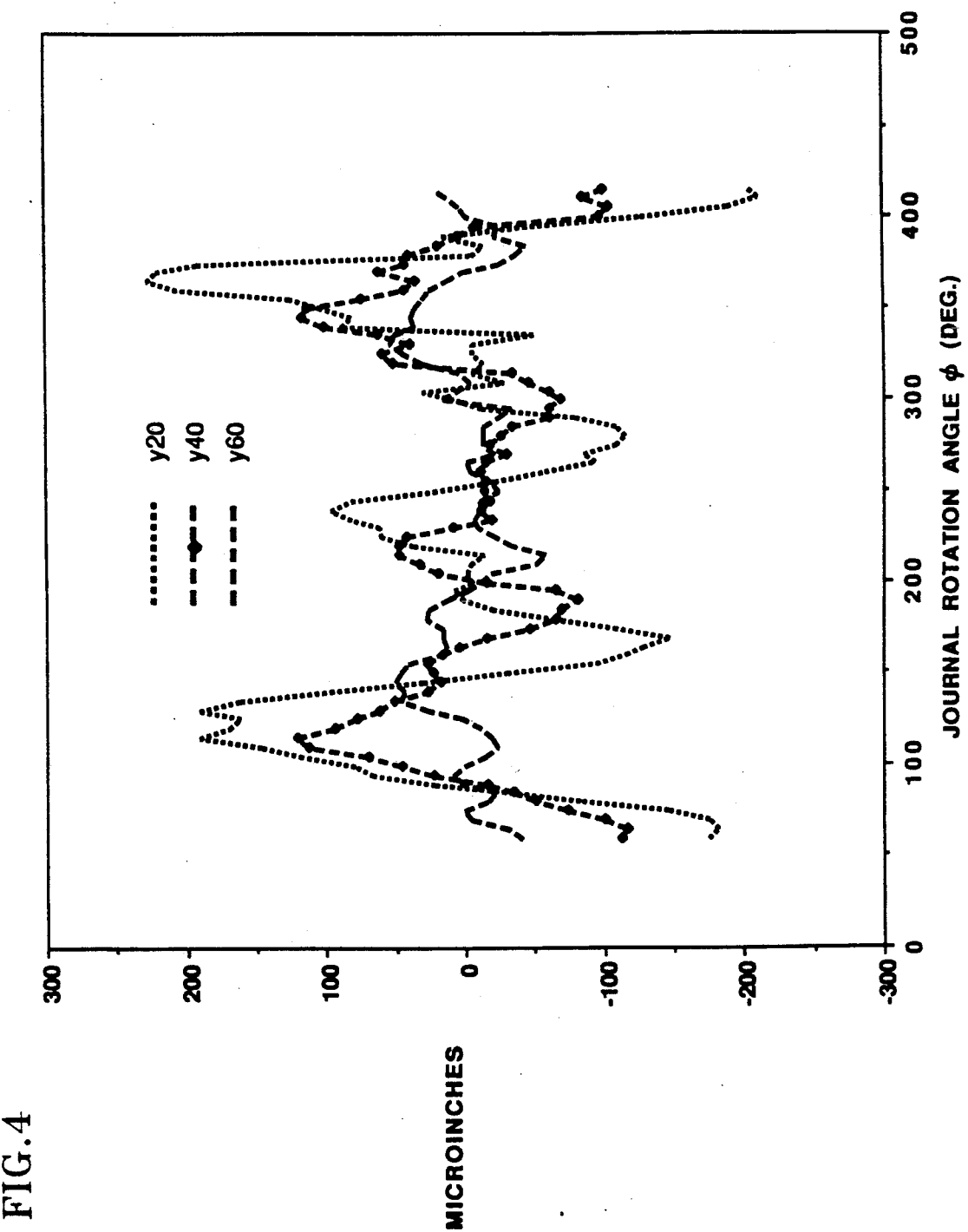
FIG. 4 is a graphic representation of the dependence of the horizontal motion of the longitudinal axis of a journal supported as in FIG. 1 on the angular displacement of the journal about it axis for different angular spacings of the bearing pads and with the out-of-round function being complex in nature.
Figure 5:
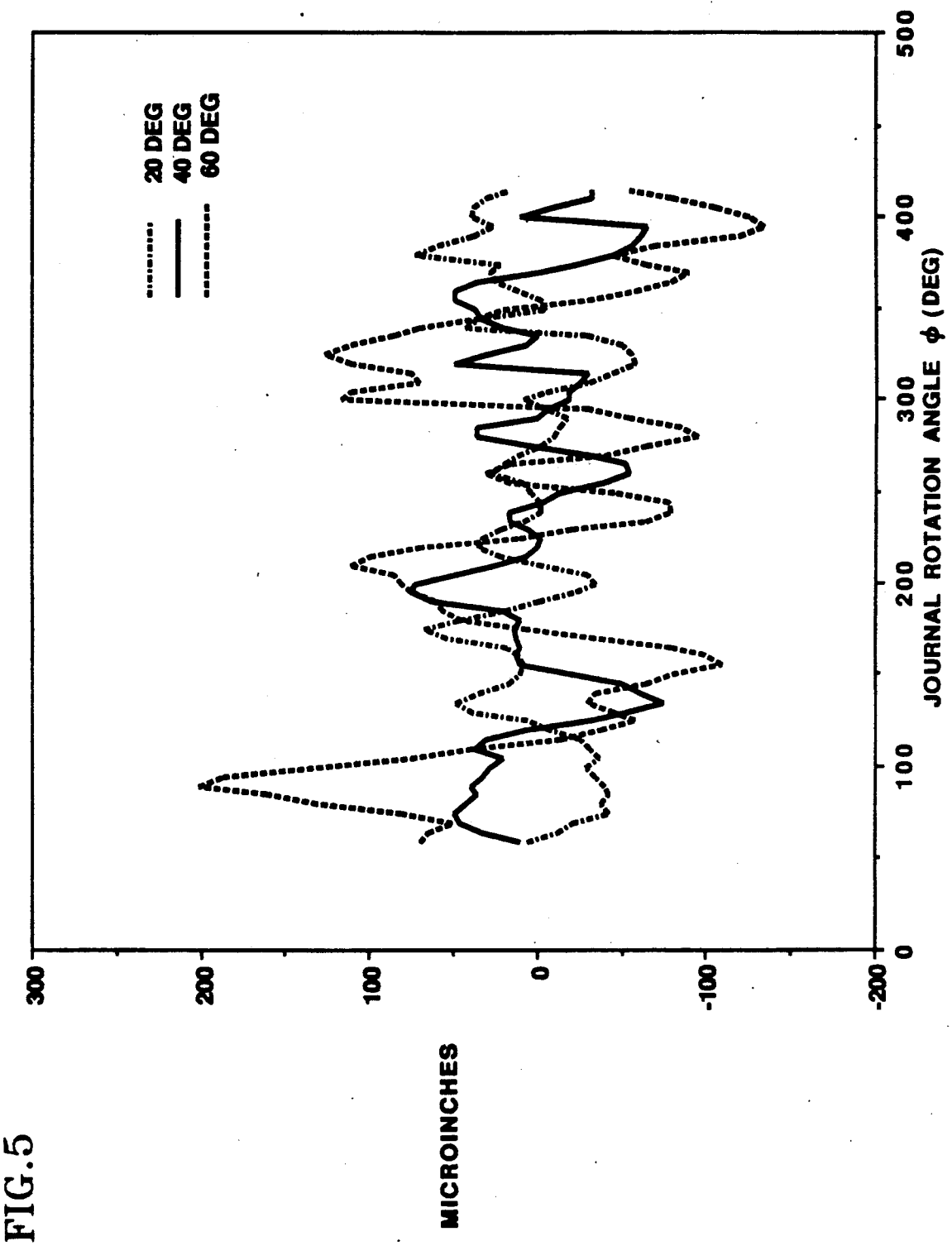
FIG. 5 is a view similar to that of FIG. 4 and showing the same kind of dependence but now for the vertical motion.

The concepts discussed above have been verified by using measurements on a journal exhibiting an unknown OOR function, as obtained on a precision measurement jig. The data points were equally spaced at 5° intervals. The measurement results are depicted in FIGS. 4 and 5 of the drawing which reveal the dependencies of the horizontal and vertical motions of the above journal 10 on the angle $\phi$ for the pads 12 and 13 being situated at half-angles $\alpha$ amounting to 20, 40 and 60°, respectively. The deviations from a best fit circle were $-100$ to $+90$ microinches. The peak excursions are presented in Table 1, below.

TABLE 1

| | Journal Motion on Two Pad Bearing | | | | |
|---|---|---|---|---|---|
| Pad Half Angle | Horizontal Motion [$\mu$in] | | Vertical Motion [$\mu$in] | | Absolute Maximum Motion [$\mu$in] |
| 20° | $-210$ | $+220$ | $-60$ | $+70$ | 220 |
| 40° | $-120$ | $+120$ | $-80$ | $+80$ | 120 |
| 60° | $-60$ | $+50$ | $-140$ | $+200$ | 200 |

The absolute maximum motion amplitude represents the peak value of the square root of the sum of the squared horizontal and vertical deviations computed at five degree increments of the rotation angle φ of the journal 10. The fact that the absolute maximum equals the greater of the horizontal and vertical motion is indicative for the out-of-phase or quadrature relationship of the component motions.

It should be clearly apparent from a comparison of FIGS. 4 and 5 that the total journal center motion is significantly smaller at 40° pad half-angle α than at either 20 or 60°, even though the horizontal excursions are the smallest for α=60° (at which half-angle, though, the vertical excursions have their greatest values) and the vertical excursions are the smallest for α=20° (at which half-angle, though, the horizontal excursions have their greatest values). The journal surface 11 does not approximate any of the pure sinusoidal OOR functions, and therefore nulling of the motion is impossible. Nevertheless, it appears that a bearing of the present invention with a half-angle α pad spacing of 40° is able to significantly reduce armature vibrations as compared to a smooth sleeve bearing.

Thus, it may be seen from the above explanation that the present invention is effective in eliminating or at least minimizing, to the extent possible or feasible, the armature or support vibration, such as that encountered in a small motor whose bearings consist of precision machined sleeves and journals. Past experience in this area has shown that 200 microinch OOR deviations of a 0.38 inch nominal diameter journal can cause the motor to vibrate and generate objectionable noise when traditional sleeve bearings are being used to mount the journal on the armature for rotation. This drawback is eliminated or at least ameliorated by the approach taken by the present invention as described above. It has been shown that total journal center motion can be minimized through the use of a pair of bearing pads 12 and 13, rather than the customary bearing sleeve. For each order of pure sinusoidal OOR functions there is at least one optimum location for the bearing pads 12 and 13 that will zero out the vertical or the horizontal journal motion.

It is further to be mentioned that, while the present invention has been described above in connection with a bearing construction consisting of two discrete pads 12 and 13, such pads 12 and 13 could be, and in practice preferably are, constituted by separate circumferentially spaced support portions of an otherwise sleeve-shaped bearing that are raised (in the radially inward directions) relative to the circumferentially adjacent portions of the bearing sleeve. The extent of such raising can be quite small, such as a fraction of a millimeter, so long as it transfers the areas of contact of the circumferential surface 11 of the journal with the bearing sleeve of the above configuration to the desired locations (of the bearing pads 12 and 13) and keeps them substantially there for the expected lifetime of the bearing. Such raised support portions could be obtained by machining a small internal recess in an otherwise conventional bearing sleeve, this recess extending from −α to +α and reaching the depth of at least twice the peak OOR amplitude of the prospective journals 10. A further alternative includes squeezing a conventional sleeve in such a manner as to force the internal surface thereof to become oval, thus causing the journal contact regions of this internal surface to rise relative to the surrounding regions to constitute the support areas 14 and 15 of the bearing pads 12 and 13, respectively.

While the present invention has been illustrated and described as embodied in particular construction of journal bearings, it will be appreciated that the present invention is not limited to these particular examples; rather, the scope of protection of the present invention is to be determined solely from the attached claims.

We claim:

1. A bearing arrangement for rotatably supporting a generally cylindrical journal having an outer circumferential surface exhibiting out-of-round (OOR) deviations superimposed on a perfect cylinder centered on a longitudinal axis, with the journal acting on the bearing arrangement with a basic radial action force aimed along a reference half-plane extending in a predetermined radial direction from the longitudinal axis, comprising
a pair of bearing pads situated at respective contact locations that are spaced in opposite circumferential directions from the reference half-plane and each extending substantially over the entire length, but at most only over an angle of five degrees of the circumference, of the outer circumferential surface to be at most in very limited area contact with said outer circumferential surface when the journal is supported thereon.

2. The bearing arrangement as defined in claim 1, wherein said contact locations are circumferentially spaced from said reference half-plane by respective half-angles that are so selected in dependence on the character of the OOR deviations as to at least minimize the extent of vibrations of the journal in and opposite to at least one of the predetermined radial direction and a radial direction normal to said half-plane.

3. The bearing arrangement as defined in claim 2, wherein said half-angles are substantially between 20 and 60°.

4. The bearing arrangement as defined in claim 3, wherein said half-angles have substantially the same absolute magnitude.

5. The bearing arrangement as defined in claim 1, wherein said bearing pads are constituted by separate elements that are stationary with respect to one another.

6. The bearing arrangement as defined in claim 1, wherein said bearing pads are constituted by support portions of a generally sleeve-shaped bearing that are raised in respective radially inward directions relative to respective circumferentially adjacent portions of the bearing.

* * * * *